United States Patent
Niijima et al.

(10) Patent No.: US 9,723,283 B2
(45) Date of Patent: Aug. 1, 2017

(54) IMAGE PROCESSING DEVICE, IMAGE PROCESSING SYSTEM, AND IMAGE PROCESSING METHOD

(71) Applicant: Kabushiki Kaisha Toshiba, Tokyo (JP)

(72) Inventors: Yoshiyuki Niijima, Tokyo (JP); Akihiko Kubota, Tokyo (JP)

(73) Assignee: Toshiba Medical Systems Corporation, Otawara-Shi (JP)

( * ) Notice: Subject to any disclaimer, the term of this patent is extended or adjusted under 35 U.S.C. 154(b) by 168 days.

(21) Appl. No.: 14/823,924

(22) Filed: Aug. 11, 2015

(65) Prior Publication Data

US 2016/0088267 A1    Mar. 24, 2016

(30) Foreign Application Priority Data

Sep. 19, 2014  (JP) .................................. 2014-191730

(51) Int. Cl.
| | |
|---|---|
| H04N 5/225 | (2006.01) |
| H04N 9/73 | (2006.01) |
| H04N 9/09 | (2006.01) |
| H04N 9/64 | (2006.01) |
| H04N 5/208 | (2006.01) |
| H04N 9/77 | (2006.01) |

(52) U.S. Cl.
CPC ............. *H04N 9/735* (2013.01); *H04N 5/208* (2013.01); *H04N 9/09* (2013.01); *H04N 9/646* (2013.01);

(Continued)

(58) Field of Classification Search
CPC ............. G09G 2320/0666; H04N 1/60; H04N 1/6077; H04N 1/608; H04N 9/735;
(Continued)

(56) References Cited

U.S. PATENT DOCUMENTS 5,911,004 A  *  6/1999  Ohuchi ..................... H04N 1/56
                                                                358/462
6,897,425 B2      5/2005  Osada
(Continued)

FOREIGN PATENT DOCUMENTS

| | | |
|---|---|---|
| JP | 20021910583 | 7/2002 |
| JP | 2010015478 | 1/2010 |
| JP | 2013025618 | 2/2013 |

*Primary Examiner* — Twyler Haskins
*Assistant Examiner* — Dwight C Tejano
(74) *Attorney, Agent, or Firm* — Blakely Sokoloff Taylor & Zafman LLP

(57) ABSTRACT

An image processing device of an embodiment includes: an input circuit to input a first to a third image signal respectively corresponding to different first to third colors of an image; a first generator to generate a fourth image signal by adding the first and second image signals; an enhancing circuit to apply edge enhancement processing to the third and fourth image signals; an output circuit to output the third and fourth image signals having undergone the edge enhancement processing in correspondence to a plurality of different areas of the image; a dividing circuit to divide the output third image signal and the output fourth image signal into a plurality of fifth image signals and a plurality of sixth image signals respectively; and a second generator to generate a luminance signal based on the plural fifth and sixth image signals.

20 Claims, 10 Drawing Sheets

(52) U.S. Cl.
CPC ......... *H04N 9/77* (2013.01); *H04N 2209/046* (2013.01); *H04N 2209/049* (2013.01)

(58) Field of Classification Search
CPC .... H04N 13/0025; H04N 1/624; H04N 3/155; H04N 5/23229; H04N 5/23232; H04N 5/23235; H04N 5/2355; H04N 5/2356; G06K 9/3275; G08B 13/19663
See application file for complete search history.

(56) References Cited

U.S. PATENT DOCUMENTS

| | | | | |
|---|---|---|---|---|
| 2001/0009438 A1* | 7/2001 | Kihara | ................ | H04N 1/6033 348/223.1 |
| 2004/0114815 A1* | 6/2004 | Shibaki | ............. | H04N 1/40062 382/233 |
| 2005/0140829 A1* | 6/2005 | Uchida | ................ | H04N 5/142 348/625 |
| 2006/0187246 A1* | 8/2006 | Miyagi | ................ | H04N 1/233 347/5 |
| 2007/0002150 A1* | 1/2007 | Abe | ...................... | H04N 9/735 348/223.1 |
| 2007/0019087 A1* | 1/2007 | Kuno | .................... | H04N 9/045 348/273 |
| 2009/0160992 A1* | 6/2009 | Inaba | .................... | G06T 3/4015 348/308 |
| 2009/0290045 A1* | 11/2009 | Fukuda | .................... | H04N 5/20 348/231.99 |
| 2010/0002130 A1 | 1/2010 | Kamio | | |
| 2010/0208097 A1* | 8/2010 | Tanabe | ................. | H04N 1/409 348/223.1 |
| 2017/0019651 A1* | 1/2017 | Kitajima | ................ | G03B 7/08 |

* cited by examiner

IMAGE PROCESSING DEVICE, IMAGE PROCESSING SYSTEM, AND IMAGE PROCESSING METHOD

CROSS REFERENCE TO RELATED APPLICATION

This application is based upon and claims the benefit of priority from the prior Japanese Patent Application No. 2014-191730, filed on Sep. 19, 2014; the entire contents of which are incorporated herein by reference.

FIELD

Embodiments described herein relate generally to an image processing device, an image processing system, and an image processing method.

BACKGROUND

In recent years, images processed by imaging devices (for example, a video camera, an electron microscope, an endoscope apparatus, and the like) and display devices have come to have higher definition. As high-definition images, there have been known, for example, what is called a Full HD (Full High Definition) image, whose number of pixels is 1920×1080 and what is called a 4K image or an 8K image, whose number of pixels is four time or eight times that of the Full HD image. Further, imaging devices and display devices capable of processing such high-definition images have been proposed. The contents of the image processing include, for example, γ correction, knee correction, noise reduction processing, edge enhancement processing, and so on. Further, in the imaging devices described above, a method called pixel shifts is known. The pixel shifts makes it possible for the imaging device to generate an image whose resolution is equal to or higher than resolution that an image sensor is capable of imaging.

BRIEF DESCRIPTION OF THE DRAWINGS

FIG. 5 is an explanatory chart of pixel shift processings by a first pixel shift processing circuit 116a.

FIG. 7 is an explanatory chart of pixel shift processings by a second pixel shift processing circuit 118a.

DETAILED DESCRIPTION

In an imaging device and a display device which process high-definition images, an image processing circuit tends to be larger scaled, which accordingly gives rise to problems such as an increase of power consumption, a temperature rise of generated heat, and a difficulty in downsizing, and so on.

An image processing device of an embodiment includes: an input circuit which inputs a first to a third image signal; a first generator which generates a fourth image signal; an enhancing circuit which applies edge enhancement processing to the third and fourth image signals; an output circuit which outputs the third and fourth image signals having undergone the edge enhancement processing in correspondence to a plurality of different areas of the image; a dividing circuit which divides the output third image signal and the output fourth image signal into a plurality of fifth image signals and a plurality of sixth image signals respectively; and a second generator which generates a luminance signal based on the plural fifth and sixth image signals.

First Embodiment

Figure 1:
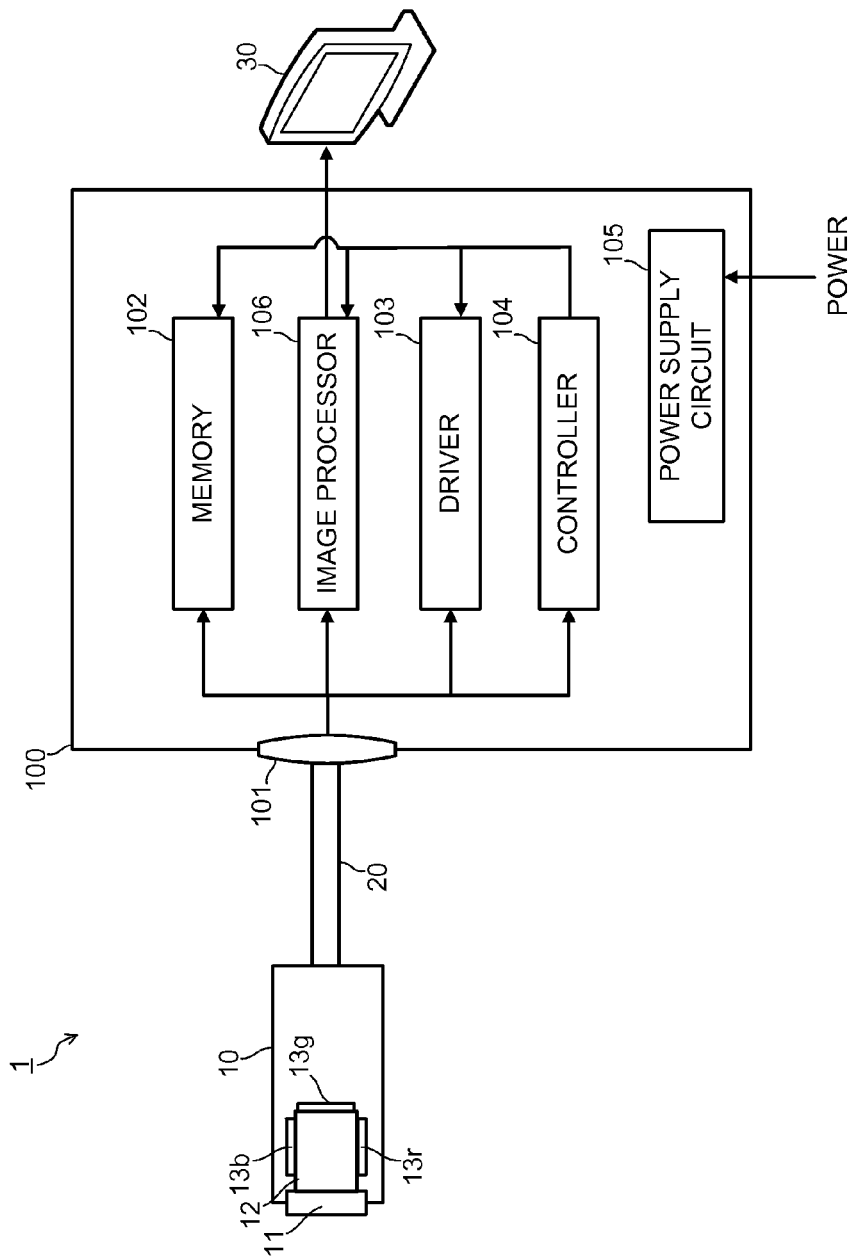
FIG. 1 is a block diagram of an imaging device 1 of a first embodiment.
Figure 2:
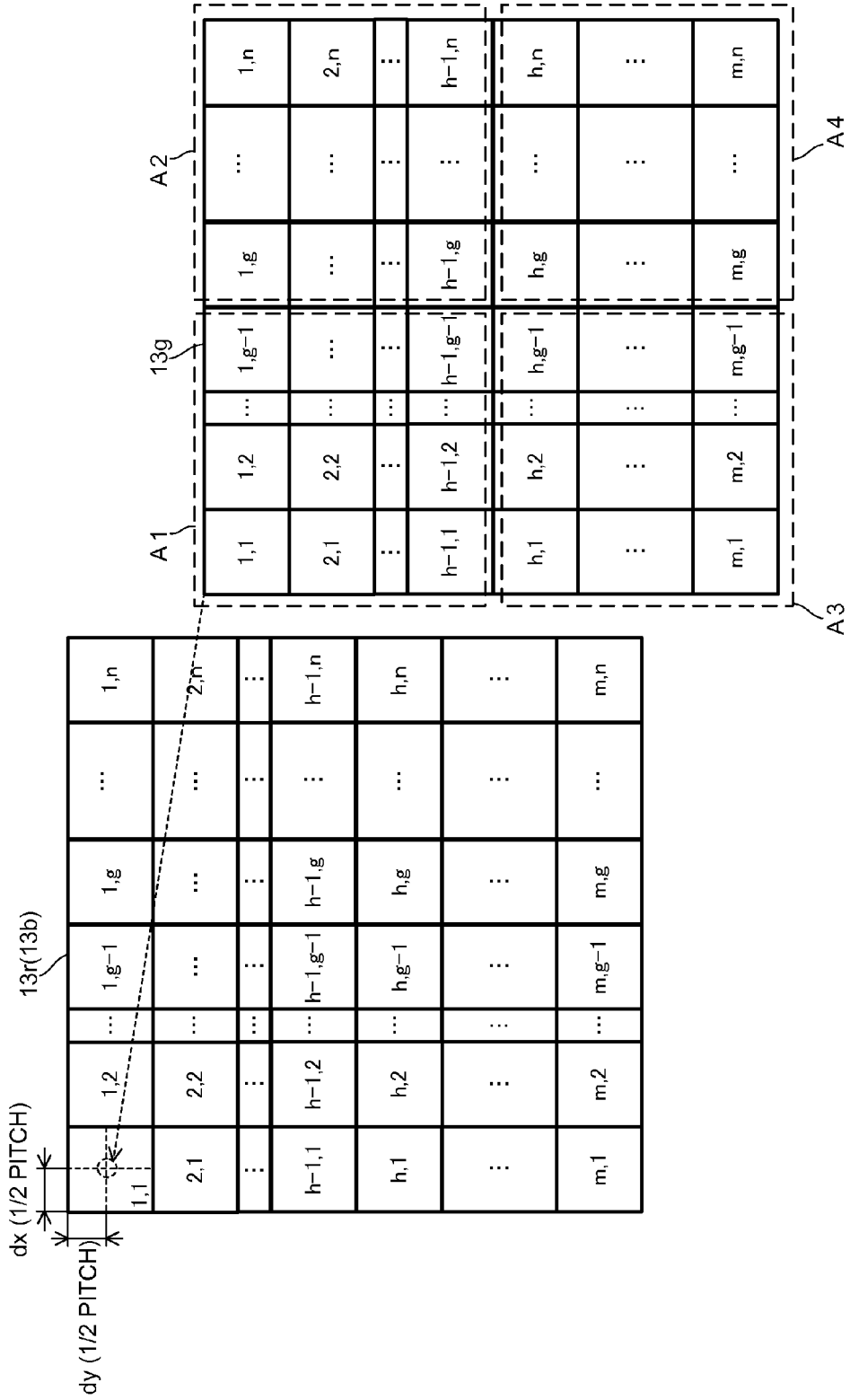
FIG. 2 is an explanatory view of spatial pixel shifts.
Figure 3:
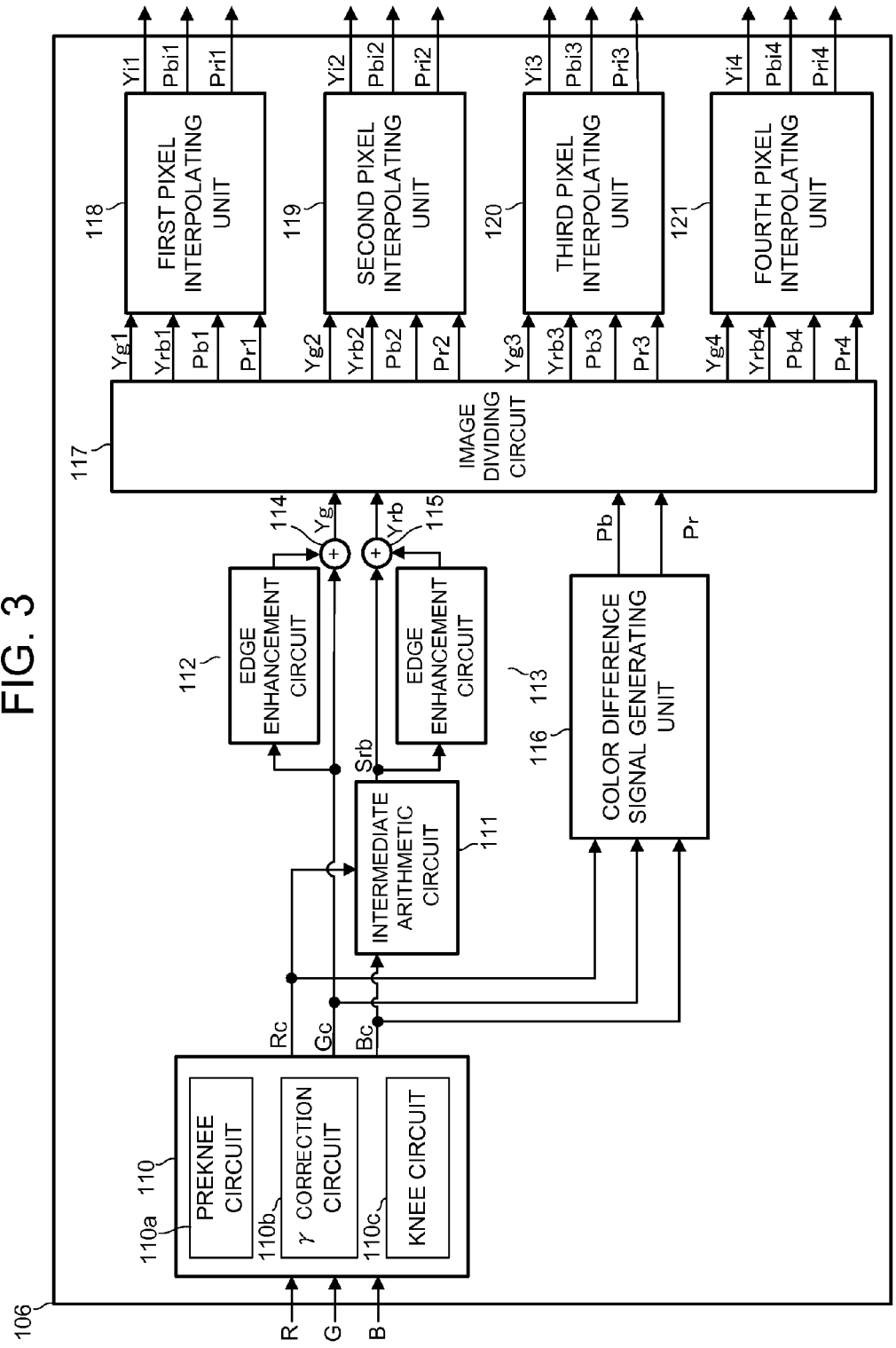
FIG. 3 is a block diagram of an image processor 106.

FIG. 1 is a block diagram of an imaging device 1 according to a first embodiment. FIG. 2 is an explanatory view of spatial pixel shifts. FIG. 3 is a block diagram of an image processor 106.

The imaging device 1 includes an imaging unit 10, a connecting unit 20, and a CCU (Camera Control Unit) 100. An image display unit 30 is connected to the imaging device 1.

The imaging device 1 is a 3-chip camera including image sensors 13r, 13g, and 13b corresponding to red (R), green (G), and blue (B) colors (first to third colors) respectively. The imaging device 1 is capable of imaging a moving image and a static image. The imaging device 1 may be a microscope apparatus, an endoscope apparatus, a digital television set, or a web camera system which has the same structure. In the web camera system, the imaging unit 10 and the CCU 100 are connected to each other via a network.

(Regarding Imaging Unit 10)

The imaging unit 10 has a lens unit 11, a prism 12, and the image sensors 13r, 13g, and 13b. The imaging unit 10 outputs R, G, B image signals output by the image sensors 13r, 13g, and 13b to the CCU 100.

The prism 12 splits light from the lens unit 11. The split lights are supplied to the image sensors 13r, 13g, and 13b respectively.

The image sensors 13r, 13g, and 13b each are a sensor in which a CMOS (Complementary Metal Oxide Semiconductor) image sensor, an A/D converter, a sample hold circuit, and so on are integrated on a chip. Incidentally, the image sensors 13r, 13g, and 13b may be CCD (Charge Coupled Device) image sensors.

As illustrated in FIG. 2, in this embodiment, the image sensors 13r, 13g, and 13b each have m×n light-receiving units (pixels). The pixels of the image sensors 13r, 13g, and 13b are arranged vertically and laterally. For example, as a result of the scanning of the light-receiving units in the lateral direction, the image signals (first to third image signals) corresponding to R, G, B respectively are generated. Incidentally, the scanning direction is not limited to the lateral direction but may be the vertical direction or may be at random.

Here, positions in space sensed by the image sensors 13r and 13b (space coordinates) coincide with each other, but positions in the space imaged by the image sensor 13g are different from those of the image sensors 13r and 13b. Disposing the image sensors 13r, 13g, and 13b so that they have such a positional relation is called spatial pixel shifts.

In more detail, the image sensor 13g outputs the image signals of positions spatially deviated from those of the image sensors 13r and 13b by a ½ pitch in each of the horizontal direction dx and the vertical direction dy. This spatial deviation appears as a phase shift of the output image signals.

Specifically, phases of the R and B image signals obtained from the image sensors 13r and 13b agree with each other but a phase of the G image signal obtained from the image sensor 13g is different. In particular, owing to the 1/2-pitch deviation of the image sensor 13g from the image sensors 13r and 13b, an aliasing noise, which is a cause of moire, of the R and B image signals and that of the G image signal are phase-inversed by 180°. Therefore, by synthesizing the R and B image signals and the G image signal at a ratio of almost 1:1, it is possible to reduce the aliasing noise contained in each of the R, G, B image signals. Especially when gains of the R, G, B image signals are equal (for example, a monochrome image), the aliasing noise can be almost completely removed.

By the spatial pixel shifts and signal processing corresponding to the spatial pixel shifts by the CCU 100, it is theoretically possible to increase the number of pixels of an image up to four times the number of the light-receiving units (the number of the pixels) that the image sensors 13r, 13g, and 13b each have. Hereinafter, "the signal processing corresponding to the spatial pixel shifts" will be referred to as pixel shift processings.

(Regarding Connecting Unit 20)

As illustrated in FIG. 1, the connecting unit 20 connects the imaging unit 10 and the CCU 100. The connecting unit 20 is a signal transmitting means through which the imaging unit 10 and the CCU 100 transmit/receive the R, G, B image signals and a control signal for controlling the imaging unit 10 by the CCU 100. The connecting unit 20 is capable of connecting the imaging unit 10 and the CCU 100 wiredly or wirelessly. The connecting unit 20 is, for example, a conductor disposed on a substrate as a circuit pattern, or a cable connecting the CCU 100 and the imaging unit 10. In a case of a web camera system, the connecting unit 20 is constituted by a LAN cable, a USB cable, the Internet line, and so on.

(Regarding Image Display Unit 30)

The image display unit 30 is, for example, CRT (Cathode Ray Tube) or a liquid crystal monitor. The image display unit 30 may be of a type externally attached to the imaging device 1, or may be of a type included in the imaging device 1 itself.

(Regarding CCU 100)

The CCU 100 includes an IF circuit 101, a memory 102, a driver 103, a controller 104, a power supply circuit 105, and an image processor 106. The IF circuit 101, the memory 102, the driver 103, the controller 104, the power supply circuit 105, and the image processor 106 can be realized by FPGA (Field-Programmable Gate Array), ASIC (Application Specific Integrated Circuit), or the like.

The IF circuit 101 is an interface for connecting the connecting unit 20. The IF circuit 101 is an input circuit which inputs the R, G, B image signals output by the image sensors 13r, 13g, and 13b to the image processor 106.

The memory 102 holds setting data (operation mode) of the imaging unit 10 and correction data. The memory 102 is used as a cache when the controller 104 performs an arithmetic operation.

The driver 103 is a drive circuit of the image sensors 13r, 13g, and 13b. The driver 103 is capable of changing a drive method and a frame rate of the image sensors 13r, 13g, and 13b under the control by the controller 104. The driver 103 transmits pulse signals for vertical synchronization and horizontal synchronization to the image sensors 13r, 13g, and 13b.

The controller 104 controls the IF circuit 101, the memory 102, the driver 103, the power supply circuit 105, and the image processor 106. The controller 104 has an arithmetic circuit and a timing signal generating circuit. The timing signal generating circuit generates, for example, a system clock signal being a basic clock signal for operating the imaging device 1 and a timing clock signal for adjusting the timing of the operation of each of the units. The controller 104 supplies the generated clock signals to each of the units.

The power supply circuit 105 is connected to an external power source. The power supply circuit 105 converts power from the external power source to a predetermined voltage and supplies the converted voltage to the IF circuit 101 to the image processor 106 and the imaging unit 10.

(Regarding Image Processor 106)

Next, the image processor 106 will be described with reference to FIG. 3. As illustrated in FIG. 3, the image processor 106 has a signal correction processing unit 110, an intermediate arithmetic circuit 111, edge enhancement circuits 112, 113, adding circuits 114, 115, a color difference signal generating unit 116, an image dividing circuit 117, and a first to a fourth pixel interpolating unit 118 to 121.

The signal correction processing unit 110 has a preknee circuit 110a, a γ correction circuit 110b, and a knee circuit 110c. To the signal correction processing unit 110 the R, G, B image signals output by the imaging unit 10 are input. The signal correction processing unit 110 applies signal processing (image processing) such as knee correction, γ correction, and edge enhancement processing to the R, G, B image signals. The signal correction processing unit 110 can also have a white balance adjusting function, a function of adjusting brightness of a dark part, and so on.

The preknee circuit 110a applies the knee processing to the R, G, B image signals. As a result, as for components exceeding a certain level in the R, G, B image signals, gains are compressed, which can suppress blown-out highlights of an image displayed on the image display unit 30. A point at which the compression of the gain starts is generally called a knee point. Further, a degree of the compression is called a knee slope.

The correction circuit 110b applies the γ correction to the R, G, B image signals having undergone the knee processing. As a result, it is possible to suppress a steep change of luminance at the knee point. Further, it is possible to adjust the R, G, B image signals properties of the display unit 30.

The knee circuit 110c has similar structure and function to those of the preknee circuit 110a. The knee circuit 110c is a processing unit to which a user manually instructs the setting of the knee processing. The knee circuit 110c applies signal processing to the R, G, B image signals having undergone the γ correction by the γ correction circuit 110b so that the knee point and the knee slope are as set by the user.

Hereinafter, the R, G, B image signals to which the signal correction processing unit 110 has applied the signal processing will be referred to as "a red image signal Rc", "a green image signal Gc", and "a blue image signal Bc" respectively.

The signal correction processing unit 110 outputs the red image signal Rc and the blue image signal Bc to each of the intermediate arithmetic circuit 111 and the color difference signal generating unit 116. Further, the signal correction processing unit 110 outputs the green image signal Gc to each of the edge enhancement circuit 112, the adding circuit 114, and the color difference signal generating unit 116.

The intermediate arithmetic circuit 111 functions as a first generator. The intermediate arithmetic circuit 111 generates a new image signal Srb by adding a pixel value of the red image signal Rc and a pixel value of the blue image signal Bc. In this case, however, the possibility of the unnatural color or the image blur in the image is low. This is because that the signals Rc and Bc are obtained from the image sensors 13*r* and 13*b* at space coordinates coinciding with each other, and thus the signals have the same phases.

The intermediate arithmetic circuit 111 calculates the image signal Srb according to a mathematical formula 1.

$$Srb = 0.75 \times Rc + 0.25 \times Bc \quad (1)$$

Srb: image signal
Rc: pixel value of red image signal
Bc: pixel value of blue image signal
0.75: first weighting factor k1
0.25: second weighting factor k2

The intermediate arithmetic circuit 111 outputs the calculated image signal Srb to each of the edge enhancement circuit 113 and the adding circuit 115. By the intermediate arithmetic circuit 111 generating the image signal Srb by using the mathematical formula 1, it is possible to collectively output the red image signal Rc and the blue image signal Bc to these units. Therefore, the number of signal lines for outputting the red, green, and blue image signals Rc, Gc, and Bc can be reduced from three down to two, which makes it possible to suppress an increase of a circuit scale.

Thereafter, as will be described in detail by using mathematical formulas 4 and 5, the image signal Srb is multiplied by "0.28", which is a fourth weighting factor, to be converted to a luminance signal Y conforming to the SMPTE (Society of Motion Picture and Television Engineers) standard.

Similarly, as will be described in detail by using mathematical formulas 8 and 9, the image signal Srb is thereafter multiplied by a factor "0.5" to be converted to a high-frequency luminance signal YH expressed by the mathematical formula 9. The factor "0.5" is a factor for reducing an aliasing noise contained in the image signal Srb. The high-frequency luminance signal YH is a signal for compensating a high-frequency component of the luminance signal Y.

To summarize the above, by previously performing part of the processing of the later calculation of the luminance signal Y and the high-frequency luminance signal YH by using the mathematical formula 1, it is possible to reduce the number of the signal lines.

The image signal Srb and the green image signal Gc are subjected to the edge enhancement processing by the edge enhancement circuits 112, 113 and the adding circuits 114, 115 respectively. That is, the edge enhancement circuits 112, 113 and the adding circuits 114, 115 function as an enhancing circuit.

"The edge enhancement processing" is processing in which an edge signal obtained by extracting a horizontal and/or vertical-direction high-frequency (edge) component(s) from a predetermined image signal is added to the predetermined signal. In the image processing, the edge enhancement processing tends to have a large computation load. This is because, for example, for all the pixels, a difference between adjacent pixels is calculated and template matching is performed, for the purpose of the edge extraction. Accordingly, power consumption is liable to increase and temperature of generated heat is liable to rise.

Before the edge signal is added to the predetermined image signal, the edge enhancement circuit 112 or 113 sometimes applies nonlinear processing and gain processing to the edge signal. "The nonlinear processing" is also called crispening or coring. In more detail, the nonlinear processing is processing in which the edge signal is not added to a signal at a certain level or lower such as noise. The nonlinear processing can suppress the noise. However, the nonlinear processing sometimes attenuates the edge signal or on the contrary, amplifies it unexpectedly.

"The gain processing" is processing to amplify the edge signal attenuated by the nonlinear processing or attenuate the edge signal unexpectedly amplified by the nonlinear processing.

The edge enhancement circuits 112 and 113 extract the edge components from the green image signal Gc and the image signal Srb. The edge enhancement circuits 112 and 113 are capable of applying the nonlinear processing and the gain processing to the extracted edge components.

The adding circuit 114 adds the green image signal Gc output by the signal correction processing unit 110 and the green image signal Gc as the edge signal output by the edge enhancement circuit 112. As a result, an image signal of Gc in which the edge component is enhanced is generated (hereinafter, referred to as "an image signal Yg").

The adding circuit 115 adds the image signal Srb output by the intermediate arithmetic circuit 111 and the image signal Srb as the edge signal output by the edge enhancement circuit 113. As a result, an image signal of Rc+Bc in which the edge component is enhanced is generated (hereinafter, referred to as "an image signal Yrb").

The adding circuits 114 and 115 output the respective image signals Yg and Yrb to the image dividing circuit 117.

Figure 4:
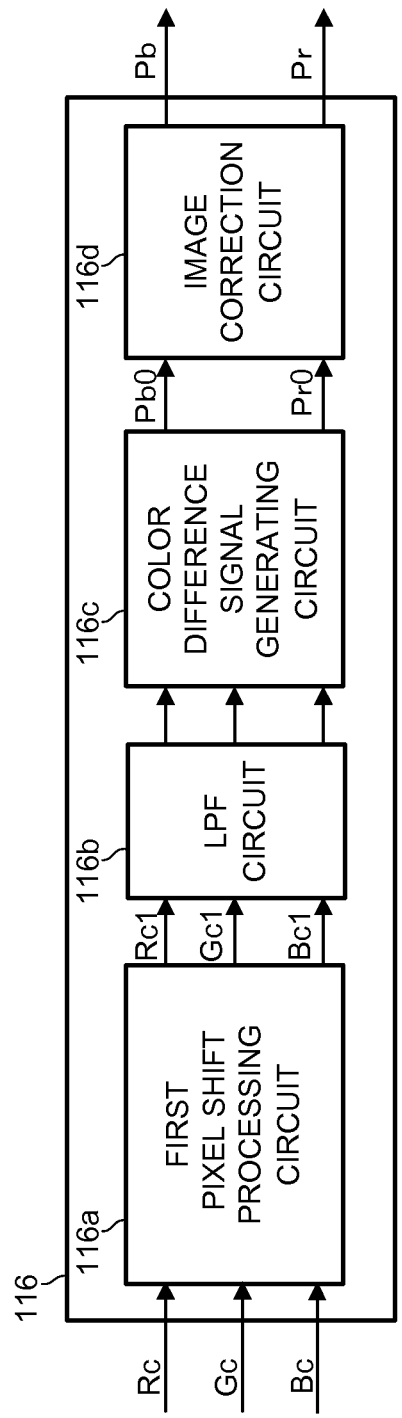
FIG. 4 is a block diagram of a color difference signal generating unit 116.
Figure 5:
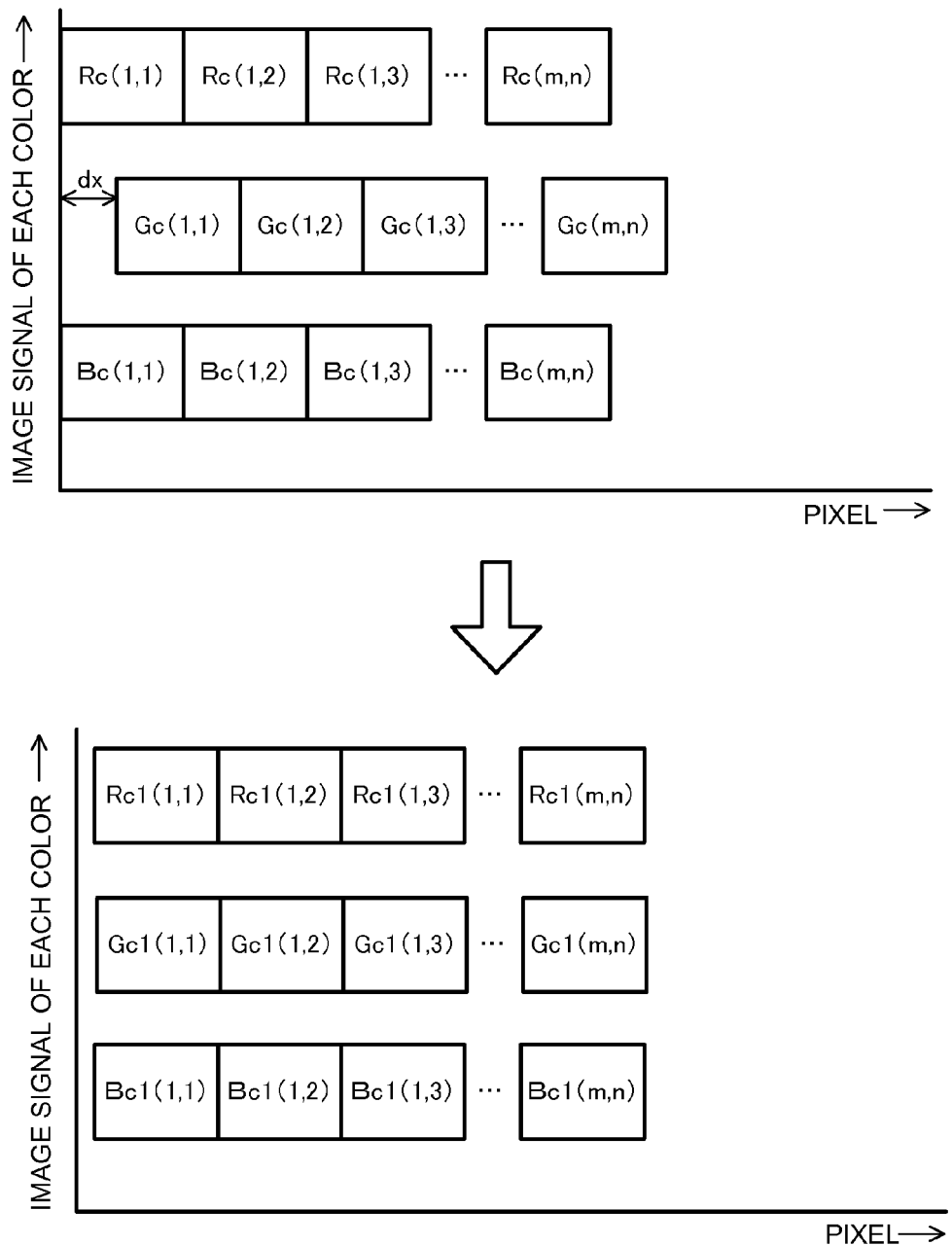

Next, the color difference signal generating unit 116 will be described with reference to FIG. 4 and FIG. 5. FIG. 4 is a block diagram of the color difference signal generating unit 116. FIG. 5 is an explanatory view of pixel shift processings by a first pixel shift processing circuit 116*a*.

As illustrated in FIG. 4, the color difference signal generating unit 116 has the first pixel shift processing circuit 116*a*, a LPF (Low Pass Filter) circuit 116*b*, a color difference signal generating circuit 116*c*, and an image correction circuit 116*d*.

The color difference signal generating unit 116 converts the red, green, and blue image signals Rc, Gc, and Bc output by the signal correction processing unit 110 to color difference signals and outputs them to the image dividing circuit 117.

The first pixel shift processing circuit 116*a* has a pixel interpolating circuit (filter circuit) for applying the pixel shift processings to the red, green, and blue image signals Rc, Gc, and Bc output by the signal correction processing unit 110.

As illustrated in FIG. 5, by interpolation processing, the first pixel shift processing circuit 116*a* generates a red image signal Rc1, a blue image signal Bc1, and a green image signal Gc1 resulting from the correction of the spatial deviation (phase shift of the signals) in the horizontal direction and the vertical direction between the red image signal Rc (and the blue image signal Bc) and the green image signal Gc. As this interpolation processing, various methods are available such as a bi-cubic interpolation method and a bi-linear interpolation method.

The optimum color difference signals Pb and Pr corresponding to the image signals Yg and Yrb output by each of the first to fourth pixel interpolating units 118 to 121 illustrated in FIG. 3 are calculated based on the red, green, and blue image signals Rc1, Gc1, and Bc1. "The optimum color difference signals" refer to color difference signals causing no color bleeding in the image displayed on the display unit 30.

The LPF circuit 116b cuts high-frequency components of the red, green, and blue image signals Rc1, Gc1, and Bc1. As a result, signals in a frequency band containing the aliasing noise are removed from the red, green, and blue image signals Rc1, Gc1, and Bc1.

The color difference signal generating circuit 116c has a color difference matrix circuit. The color difference signal generating circuit 116c generates color difference signals Pb0 and Pr0 based on the red, green, and blue image signals Rc1, Gc1, and Bc1.

The image correction circuit 116d has a function corresponding to that of the knee circuit 110c. Through the image correction circuit 116d, a user can manually apply the knee processing to the color difference signals Pb0 and Pr0. Applying the knee processing to the color difference signals Pb0 and Pr0 makes it possible to arbitrarily change color saturation and hue of the image displayed on the display unit 30.

The image correction circuit 116d outputs the color difference signals Pb0 and Pr0 having undergone the knee processing to the image dividing circuit 117 (refer to the color difference signals Pb and Pr in FIG. 3 an FIG. 4).

The image dividing circuit 117 functions as an output circuit and a second output circuit. The image dividing circuit 117 has a frame memory and a counter circuit. As illustrated in FIG. 3, the image dividing circuit 117 holds the image signals Yg, Yrb and the color difference signals Pb, Pr for one screen (one frame) which are output by the adding circuits 114, 115 and the color difference signal generating unit 116 respectively.

The image dividing circuit 117 outputs the held image signals Yg, Yrb and color difference signals Pb, Pr corresponding to each of predetermined areas of the image for one frame displayed on the display unit 30 to each of the first to fourth pixel interpolating units 118 to 121.

"The predetermined areas" are, for example, totally four areas into which the image for one frame is two-divided vertically and is two-divided laterally. The number of the areas corresponds to the number of the first to fourth pixel interpolating units 118 to 121.

For example, the divided four areas correspond respectively to a first area A1 surrounded by a virtual quadrangle whose vertexes are the pixels (1, 1), (1, g−1), (h−1, 1), (h−1, g−1) of the image sensor 13g illustrated in FIG. 2, similarly a second area A2 whose vertexes are the pixels (1, g), (1, n), (h−1, g), (h−1, n), a third area A3 whose vertexes are the pixels (h, 1), (h, g−1), (m, 1), (m, g−1), and a fourth area A4 whose vertexes are the pixels (h, g), (h, n), (m, g), (m, n). The same applies to the image sensors 13r and 13b.

The image dividing circuit 117 outputs, for example, the image signals Yg, Yrb and the color difference signals Pb, Pr corresponding to the first area A1 to the first pixel interpolating unit 118 (refer to image signals Yg1, Yrb1 and color difference signals Pb1, Pr1 in FIG. 3). Similarly, the image dividing circuit 117 outputs the image signals Yg, Yrb and the color difference signals Pb, Pr corresponding to the second to fourth areas A2 to A4 to the second to fourth pixel interpolating units 119 to 121 respectively (refer to image signals Yg2 to Yg4, Yrb2 to Yrb4 and color difference signals Pb2 to Pb4, Pr2 to Pr4 in FIG. 3).

The image dividing circuit 117 is capable of counting the number of the image signals Yg, Yrb and the color difference signals Pb, Pr output to each of the first to fourth pixel interpolating units 118 to 121, by the counter circuit. Consequently, the image dividing circuit 117 is capable of discriminating the pixels (for example, the pixel (1, g−1), the pixel (1, g), and so on) located at area boundaries of the first to fourth areas A1 to A4 illustrated in FIG. 2.

In the pixel shift processings by the first to fourth pixel interpolating units 118 to 121, an arithmetic operation is performed on the signals (the image signals Yg, Yrb and the color difference signals Pb, Pr) of, for example, the pixel (1, g) and the signals of, for example, the pixels (1, g−1) and (1, g), which makes it possible to increase the number of pixels to be displayed.

Here, when the pixel (1, g) is located at a left end of the second area A2, if the areas are simply demarcated, the pixel (1, g−1) is allocated to the first area A1 and is not allocated to the second area A2. In this case, the signals of the pixel (1, g−1) that are to be operated with the signals of the pixel (1, g) do not exist in the second area A2, so that the left end pixel of the second area A2 output from the second pixel interpolating unit 119 bear an unnatural color. To prevent the occurrence of such an unnatural color, it is necessary to allocate the signals of the pixel (1, g−1) to both of the areas A1, A2.

The above circumstances are the same in all the boundaries of the first to fourth areas A1 to A4, and the image dividing circuit 117 allocates the signals so that no combination of the signals that are to be operated is lacking in any of the boundaries, and outputs the signals to the first to fourth pixel interpolating units 118 to 121. As a result, it is possible to suppress the display of an unnatural image in the boundaries of the divided areas.

(Regarding First Pixel Interpolating Unit 118)

Figure 6:
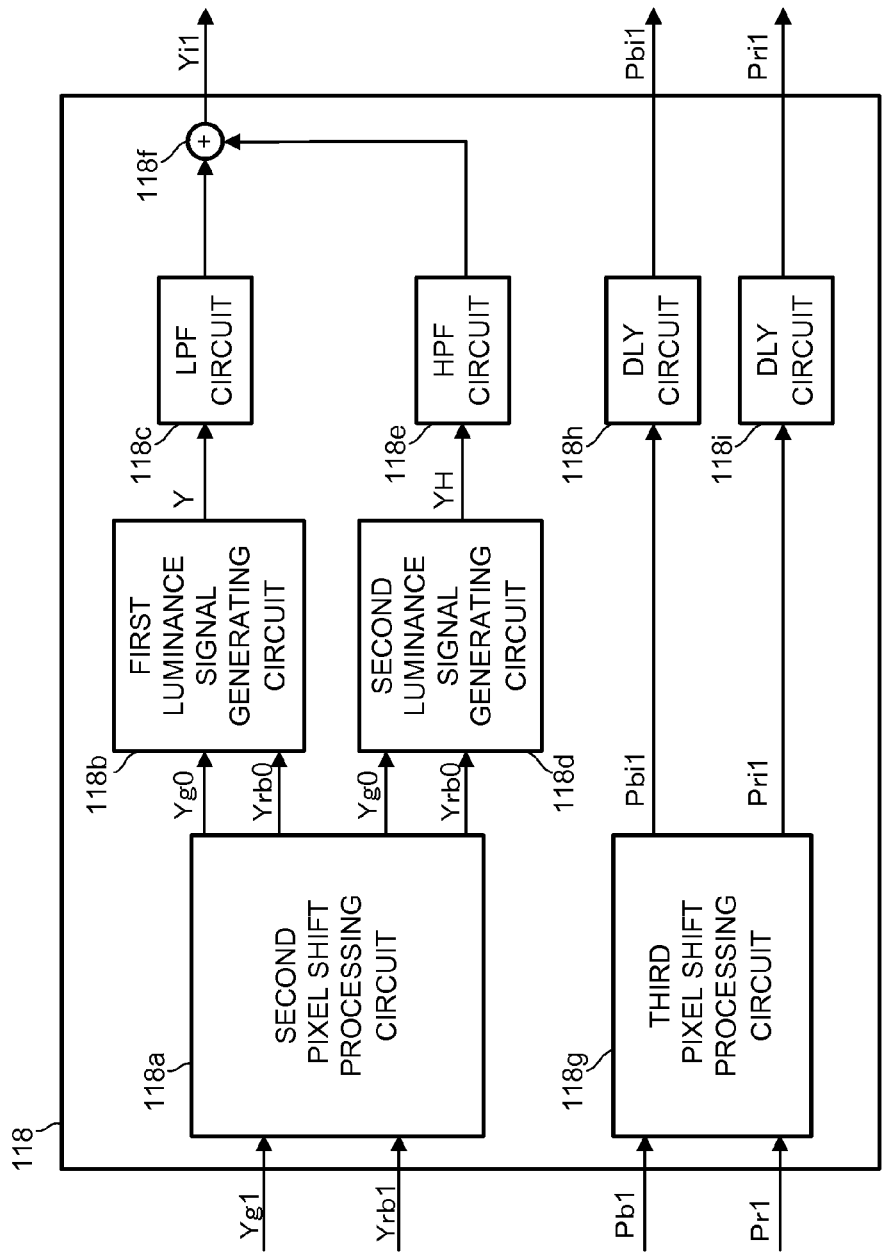
FIG. 6 is a block diagram of a first pixel interpolating unit 118.
Figure 7:
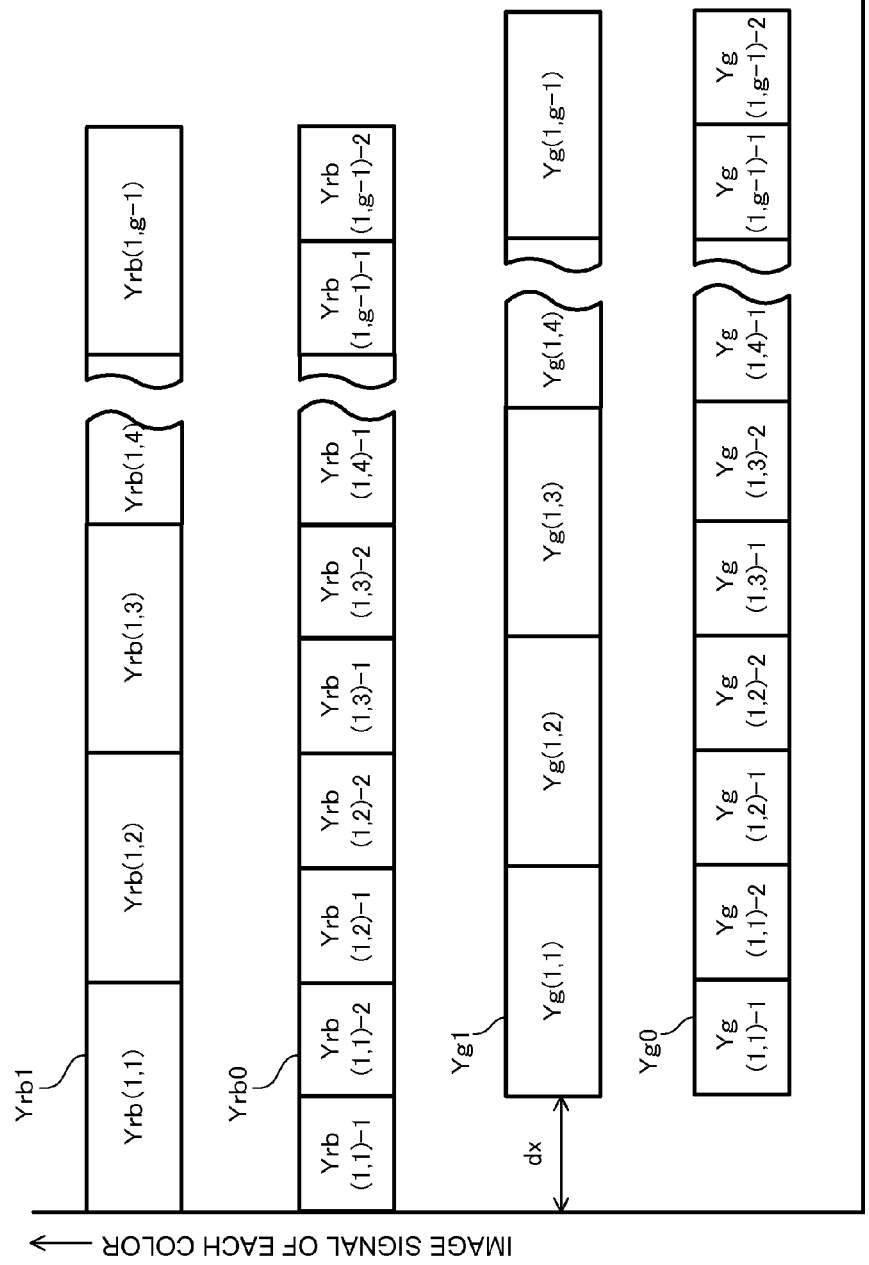
Figure 8:
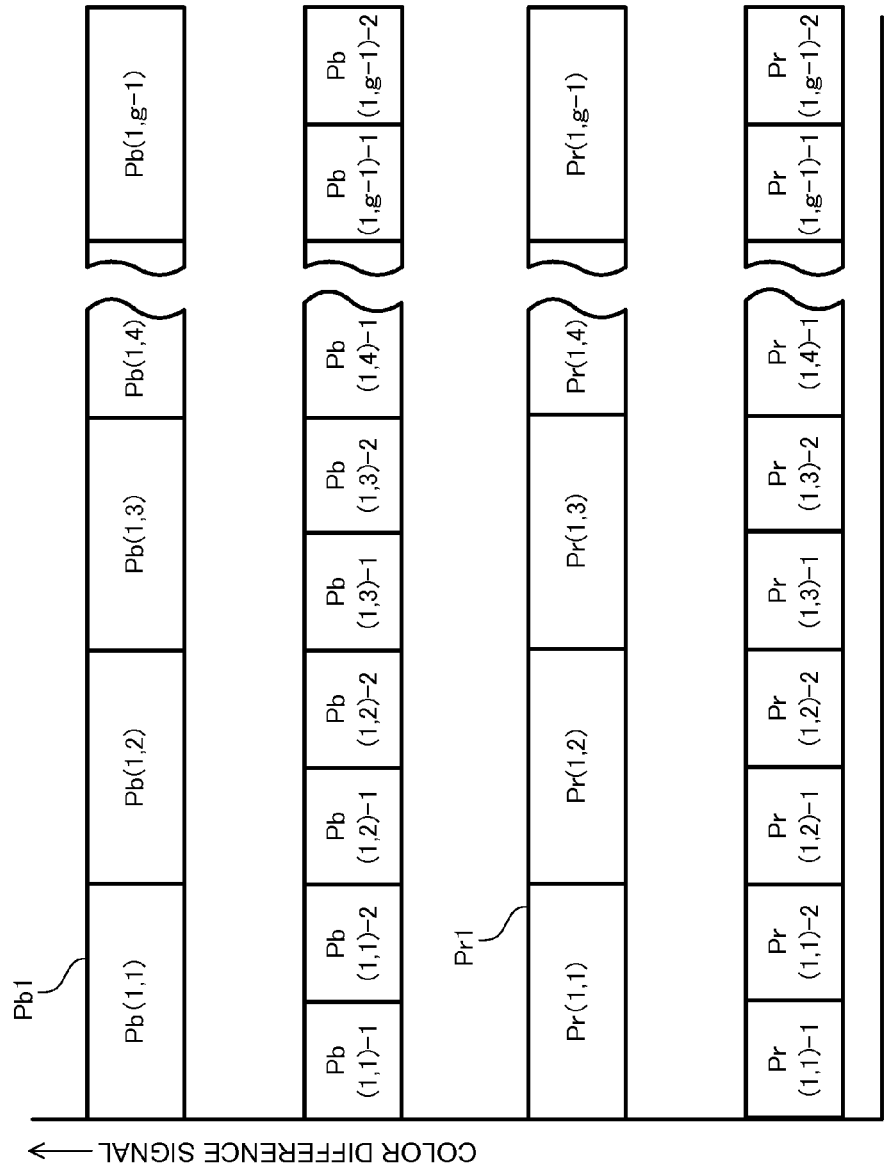
FIG. 8 is an explanatory chart of pixel shift processings by a third pixel shift processing circuit 118g.

Next, the first pixel interpolating unit 118 will be described with reference to FIG. 6 to FIG. 8. FIG. 6 is a block diagram of the first pixel interpolating unit 118. FIG. 7 is an explanatory chart of pixel shift processings by a second pixel shift processing circuit 118a. FIG. 8 is an explanatory chart of pixel shift processings by a third pixel shift processing circuit 118g. A detailed description of the second to fourth pixel interpolating units 119 to 121 will be omitted since they have the same structure and function as those of the first pixel interpolating unit 118.

As illustrated in FIG. 6, the first pixel interpolating unit 118 has the second pixel shift processing circuit 118a, a first luminance signal generating circuit 118b, a LPF circuit 118c, a second luminance signal generating circuit 118d, a HPF (High Pass Filter) circuit 118e, an adding circuit 118f, the third pixel shift processing circuit 118g, DLY (DELAY) circuits 118h and 118i.

The second pixel shift processing circuit 118a functions as a dividing circuit. The first luminance signal generating circuit 118b, the second luminance signal generating circuit 118d, and the adding circuit 118f function as a second generator. The second pixel shift processing circuit 118a has a pixel interpolating circuit (for example, an interpolator) for applying the pixel shift processings to the image signals Yg1 and Yrb1 output from the image dividing circuit 117.

As illustrated in FIG. 7, the second pixel shift processing circuit 118a is capable of reading the image signals Yg(1, 1), . . . , Yg(1, g−1) and Yrb(1, 1), . . . , Yrb(1, g−1) constituting the image signals Yg1 and Yrb1 by the pixel interpolating circuit by a clock twice as fast as that of an operating clock of the imaging unit 10 and so on. The coordinates (1, 1), . . . , (1, g−1) indicated in FIG. 7 correspond to the coordinates of the pixels of the image sensors 13r to 13b illustrated in FIG. 2.

At this time, the second pixel shift processing circuit 118a increases the number of the signals of each image two times and reads them. The second pixel shift processing circuit 118a reads, for example, the image signal Yrb(1, 1) as image signals Yrb(1, 1)-1 and Yrb(1, 1)-2. This processing is sometimes called double sampling. This increases the number of the pixels in the horizontal direction dx two times.

Further, the second pixel shift processing circuit 118a applies the same processing also to the other pixel rows (the image signals Yg(2, 1) to Yg(2, g-1), ..., the image signals Yrb(h-1, 1) to Yrb(h-1, g-1), though the illustration thereof is omitted here. Further, by using thus read image signals in each of the pixel rows, the number of the pixels in the vertical direction dy also increases two times.

Therefore, the second pixel shift processing circuit 118a is capable of scaling up the number of the pixels corresponding to the first area A totally four times in the horizontal direction and the vertical direction, by using the image signals Yrb1 and Yg1 output from the image dividing circuit 117.

The second pixel shift processing circuit 118a outputs the read image signals Yg(1, 1)-1, (1, 1)-2 to (1, g)-1, (1, g)-2 and Yrb(1, 1)-1, (1, 1)-2 to (1, g)-1, (1, g)-2 to each of the first luminance signal generating circuit 118b and the second luminance signal generating circuit 118d (refer to "Yg0" and "Yrb0" in FIG. 6).

The first luminance signal generating circuit 118b calculates the luminance signal Y conforming to the SMPTE standard based on the image signals Yg0 and Yrb0 having undergone the pixel shift processings, which are output by the second pixel shift processing circuit 118a.

A luminance signal of the SMPTE standard is expressed by a mathematical formula 2, for instance.

$$Y=0.2126 \times R+0.7152 \times G+0.722 \times B \qquad (2)$$

Y: luminance value of luminance signal
R: pixel value of red image signal
G: pixel value of green image signal
B: pixel value of blue image signal The first luminance signal generating circuit 118b calculates the luminance signal Y corresponding to the luminance signal Y expressed by the mathematical formula 2 based on a mathematical formula 3.

$$Y_{(x, y)\text{-}n}=0.21 \times Rc0_{(x, y)\text{-}n}+0.72 \times Gc0_{(x, y)\text{-}n}+0.07 \times Bc0_{(x, y)\text{-}n} \qquad (3)$$

$Y_{(x, y)\text{-}n}$: luminance value of luminance signal corresponding to each pixel
$Rc0_{(x, y)\text{-}n}$: pixel value of red image signal output from the adding circuit 115
$Gc0_{(x, y)\text{-}n}$: pixel value of green image signal output from the adding circuit 114
$Bc0_{(x, y)\text{-}n}$: pixel value of blue image signal output from the adding circuit 115
x: coordinate of pixel in horizontal direction
y: coordinate of pixel in vertical direction
n: integer 1 or 2
0.21: numerical value equal to product of first and fourth weighting factors k1 and k4
0.72: third weighting factor k3
0.07: numerical value equal to product of second and fourth weighting factors k2 and k4

Here, "(x, y)-n" corresponds to each of the double-sampled pixels illustrated in FIG. 7, for instance (refer to "Yg(1, 1)-1" and "Yrb(1, 1)-2" in FIG. 7). The same applies to the following mathematical formulas 4 to 9.

A deriving method of the mathematical formula 3 will be described.

The first luminance signal generating circuit 118b performs an arithmetic operation by the mathematical formula 4 based on the image signals Yg0 and Yrb0 illustrated in FIG. 6 and FIG. 7, which are read by the second pixel shift processing circuit 118a.

$$Y=0.72 \times Yg_{(x, y)\text{-}n}+0.28 \times Yrb_{(x, y)\text{-}n} \qquad (4)$$

Y: luminance value of luminance signal
$Yg_{(x, y)\text{-}n}$: pixel value of green image signal
$Yrb_{(x, y)\text{-}n}$: pixel value of red+blue image signal
x: coordinate of pixel in horizontal direction
y: coordinate of pixel in vertical direction
n: integer 1 or 2
0.28: fourth weighting factor k4

"0.28" being the fourth weighting factor indicated in the mathematical formula 4 is set in order to obtain a pixel value of the red+blue image signal necessary for the luminance signal of the SMPTE standard, from the pixel value $Yrb_{(x, y)\text{-}n}$ of the red+blue image signal.

Here, the pixel value $Yrb_{(x, y)\text{-}n}$ of the red+blue image signal is the sum of the image signal Srb calculated by the intermediate arithmetic circuit 111 and the image signal Srb resulting from the edge enhancement processing of the image signal Srb by the edge enhancement circuit 113. That is, the pixel value $Yrb_{(x, y)\text{-}n}$ of the red+blue image signal is calculated based on the following mathematical formulas 5 and 6. the mathematical formula 5 is expressed by multiplying the fourth weighting factor k4 to the mathematical formula 1.

$$Yrb_{(x, y)\text{-}n}=0.28 \times (0.75 \times Rc0_{(x, y)\text{-}n}+0.25 \times Bc0_{(x, y)\text{-}n}) \qquad (5)$$

That is, $$Yrb_{(x, y)\text{-}n}=0.21 \times Rc0_{(x, y)\text{-}n}+0.07 \times Bc0_{(x, y)\text{-}n} \qquad (6)$$

$Yrb_{(x, y)\text{-}n}$: pixel value of red+blue image signal
$Rc0_{(x, y)\text{-}n}$: pixel value of red image signal output from the adding circuit 115
$Bc0_{(x, y)\text{-}n}$: pixel value of blue image signal output from the adding circuit 115
x: coordinate of pixel in horizontal direction
y: coordinate of pixel in vertical direction
n: integer 1 or 2

As described above, by multiplying $Yrb_{(x, y)\text{-}n}$ of the red+blue image signal by "0.28" being the fourth weighting factor, it is possible to finally calculate the pixel value of the red+blue image signal necessary for calculating the luminance signal Y expressed by the mathematical formula 3, as expressed by the mathematical formulas 5 and 6.

As described above, the pixel value $Yg_{(x, y)\text{-}n}$ of the green image signal is the sum of the green image signal Gc output from the signal correction processing unit 110 and the green image signal Gc resulting from the edge enhancement processing of the green image signal Gc by the edge enhancement circuit 112. Therefore, the pixel value $Yg_{(x, y)\text{-}n}$ of the green image signal is calculated based on the following mathematical formula 7.

$$Yg_{(x, y)\text{-}n}=0.72 \times Gc0_{(x, y)\text{-}n} \qquad (7)$$

$Yg_{(x, y)\text{-}n}$: pixel value of green image signal
$Gc0_{(x, y)\text{-}n}$: pixel value of green image signal output from the adding circuit 114
x: coordinate of pixel in horizontal direction
y: coordinate of pixel in vertical direction
n: integer 1 or 2

According to the above mathematical formulas 4 to 7, the luminance signal $Y_{(x, y)\text{-}n}$ is calculated based on the mathematical formula 3.

Through the above processing, the luminance value of each of the up-scaled pixels of the image is calculated.

The LPF circuit 118c cuts a high-frequency component of the luminance signal Y. As a result, a signal in a frequency band containing the aliasing noise, which is contained in the luminance signal Y, is removed.

The second luminance signal generating circuit 118d calculates the high-frequency luminance signal YH that is to be mixed with the luminance signal Y calculated by the first luminance signal generating circuit 118b. The processing of mixing the luminance signal Y and the high-frequency luminance signal YH is sometimes called mixed highs processing. The mixed highs processing is processing to compensate the high-frequency component of the luminance signal Y cut by the LPF circuit 118c. The second luminance signal generating circuit 118d calculates the high-frequency luminance signal YH based on the image signals Yg0 and Yrb0 having undergone the pixel shift processings, which are output by the second pixel shift processing circuit 118a.

The second luminance signal generating circuit 118d averages the R, B image signals and the G image signal obtained from the image sensors 13r, 13b, and 13g arranged by the spatial pixel shifts, thereby capable of calculating the high-frequency luminance signal YH in which the aliasing noises being a cause of the moire, which are contained in these image signals, are reduced. This is because the aliasing noises causing the moire in the R, B image signals and the G image signal are phase-inverted by 180°, due to the spatial pixel shifts.

The second luminance signal generating circuit 118d calculates the high-frequency luminance signal YH in which the aliasing noise is reduced, based on the mathematical formula 8. Further, the mathematical formula 8 can be transformed into the mathematical formula 9 similarly to the mathematical formula 3.

$$YH = 0.5 \times Yg_{(x, y)\text{-}n} + 0.5 \times Yrb_{(x, y)\text{-}n} \tag{8}$$

$$YH = 0.375 \times Rc0_{(x, y)\text{-}n} + 0.5 \times Gc0_{(x, y)\text{-}n} + 0.125 \times Bc0_{(x, y)\text{-}n} \tag{9}$$

YH: high-frequency luminance signal
$Yg_{(x, y)\text{-}n}$: pixel value of green image signal
$Yrb_{(x, y)\text{-}n}$: pixel value of red+blue image signal
$Rc0_{(x, y)\text{-}n}$: pixel value of red image signal output from the adding circuit 115
$Gc0_{(x, y)\text{-}n}$: pixel value of green image signal output from the adding circuit 114
$Bc0_{(x, y)\text{-}n}$: pixel value of blue image signal output from the adding circuit 115
x: coordinate of pixel in horizontal direction
y: coordinate of pixel in vertical direction
n: integer 1 or 2
0.5: fifth weighting factor k5
0.5: sixth weighting factor k6
0.375: numerical value equal to product of first and sixth weighting factors k1 and k6
0.125: numerical value equal to product of second and sixth weighting factors k2 and k6

Here, the mathematical formula 9 is an approximate expression of the mathematical formula 3. That is, the high-frequency luminance signal YH calculated based on the mathematical formula 9 is an approximate value of the luminance signal Y calculated based on the mathematical formula 3. Therefore, there is no problem at all even if the high-frequency luminance signal YH and the luminance signal Y are added.

The high-frequency luminance signal YH in which an influence of the aliasing noise is reduced is obtained by the arithmetic operation in the above-described manner. When the image signal Yrb is focused on, in calculating the image signal Srb based on the mathematical formula 1, the intermediate arithmetic circuit 111 multiplies the red image signal Rc and the blue image signal Bc by "0.75" being the first weighting factor k1 and "0.25" being the second weighting factor k2 respectively as described above.

As a result, as is seen from the mathematical formulas 8 and 9, while performing the arithmetic operation for reducing the influence of the aliasing noise by multiplying the image signal Yrb by "0.5" being the sixth weighting factor k6, the second luminance signal generating circuit 118d is capable of finally calculating the high-frequency luminance signal YH expressed by the mathematical formula 9.

The HPF circuit 118e filters out low to mid frequency components of the high-frequency luminance signal YH. As a result, components corresponding to the luminance signal Y output by the LPF circuit 118c, in the frequency luminance signal YH are removed.

The adding circuit 118f generates a luminance signal Yi1 by adding (mixing) the high-frequency luminance signal YH and the luminance signal Y.

As described above, the first pixel interpolating unit 118 generates the luminance signal Yi1 from the luminance signal Y and the high-frequency luminance signal YH. The luminance signal Y calculated based on the mathematical formula 3 is given the weights closer to those of the luminance signal of the SMPTE standard calculated based on the mathematical formula 2 than the high-frequency luminance signal YH calculated based on the mathematical formula 9. However, the luminance signal Y calculated based on the mathematical formula 3 contains the aliasing noise in the high-frequency component.

On the other hand, as compared with the luminance signal Y calculated based on the mathematical formula 3, the high-frequency luminance signal YH calculated based on the mathematical formula 9 has a larger difference from the luminance signal of the SMPTE standard calculated based on the mathematical formula 2. However, in the high-frequency luminance signal YH, the aliasing noise in the high-frequency component is reduced by the arithmetic operation.

In other words, it can be said that, in the luminance signal Y calculated based on the mathematical formula 3, a low frequency component is of higher quality as compared with the high-frequency luminance signal YH calculated based on the mathematical formula 9, and in the high-frequency luminance signal YH calculated based on the mathematical formula 9, the high-frequency component is of higher quality as compared with the luminance signal Y calculated based on the mathematical formula 3. The adding circuit 118f adds such luminance signal Y and high-frequency luminance signal YH to finally generate the luminance signal Yi1 whose low to high-frequency components are of high quality.

The third pixel shift processing circuit 118g functions as a second dividing circuit. The third pixel shift processing circuit 118g has a pixel interpolating circuit (for example, an interpolator) for applying pixel shift processings to the color difference signals Pb1 and Pr1 output from the image dividing circuit 117.

As illustrated in FIG. 8, the third pixel shift processing circuit 118g is capable of reading color difference signals Pb(1, 1), . . . , Pb(1, g–1) and color difference signals Pr(1, 1), . . . , Pr(1, g–1) constituting the color difference signals Pb1 and Pr1, by the pixel interpolating circuit by a clock twice as fast as the operating clock of the imaging unit 10 and so on. The coordinates (1, 1), . . . , (1, g–1) indicated in FIG. 8 correspond to the coordinates of the red to green image signals Rc1 to Gc1 having undergone the pixel shifts by the first pixel shift processing circuit 116a as illustrated in FIG. 5.

At this time, the third pixel shift processing circuit 118g increases the number of each of the image signals two times and reads them. For example, the third pixel shift processing circuit 118g reads the color difference signal Pb(1, 1) as color difference signals Pb(1, 1)–1 and Pb(1, 1)–2.

Further, the third pixel shift processing circuit 118g applies the same processing also to the other pixel rows (color difference signals Pb(2, 1) to Pb(2, g–1), . . . , color difference signals Pr(h–1, 1) to Pr(h–1, g–1)), though the illustration thereof is omitted here.

As a result, color difference signals Pbi1 and Pri1 are generated. The Pbi1 and Pri1 correspond to the luminance signal Y calculated by the first luminance signal generating circuit 118b and the high-frequency luminance signal YH calculated by the second luminance signal generating circuit 118d (refer to FIG. 6).

The DLY circuits 118h and 118i each have a DELAY circuit. The DLY circuits 118h and 118i delay the output timing of the color difference signals Pbi1 and Pri1 by a predetermined time. A reason for this is that the time for the second pixel shift processing circuit 118a to the adding circuit 118f to generate and output the luminance signal Yi1 is longer than the time for the third pixel shift processing circuit 118g to generate and output the color difference signals Pbi1 and Pri1. As a result, the luminance signal Yi1 and the color difference signals Pbi1 and Pri1 are output to a subsequent stage at the same timing.

As described above, by the pixel shift processings by the first pixel interpolating unit 118, the number of the pixels of the image corresponding to the first area A1 illustrated in FIG. 2 is increased two times in each of the horizontal direction and the vertical direction, which can finally increase the number of the pixels four times. Similarly, by the pixel shift processings, the second to fourth pixel interpolating units 119 to 121 increase the number of the pixels of the images corresponding to the second to fourth areas A2 to A4 illustrated in FIG. 2 two times in each of the horizontal direction and the vertical direction, thereby capable of increasing the number of the pixels totally four times.

Therefore, when, for example, Full HD image signals are output by the image sensors 13r, 13g, and 13b, it is possible to scale up an image to a 4K image owing to the pixel shift processings by the first to fourth pixel interpolating units 118 to 121. Further, when, for example, signals of a 4 k image are output by the image sensors 13r, 13g, and 13b, the 4 k image can be scaled up to an 8K image owing to the pixel shift processings by the first to fourth pixel interpolating units 118 to 121.

Conventional Example

For example, when a 4K image is processed, since the number of pixels increases four times that of a Full HD image, a computation amount accompanying the image processing increases. There has conventionally been a system capable of processing a FULL HD image at 59.94 fps by an arithmetic circuit whose operating clock is around 150 [MHz]. In order to process the 4K image at 59.94 fps, an arithmetic circuit whose operating clock is around 600 [MHz] is required, and in order to process an 8K or higher image, an arithmetic circuit which operates by a higher-speed clock is required.

In some case, it is difficult to develop the arithmetic circuit which operates by the high-speed clock or it is difficult to mount it in an imaging device in view of cost. By mounting a plurality of arithmetic circuits to perform the image processing in parallel, it is possible to process a high-definition image without the arithmetic circuit which operates by the high-speed clock being mounted in the imaging device. However, mounting the plural arithmetic circuits naturally increases a circuit scale of the whole imaging device. As a result, problems arise such as an increase of power consumption and a temperature increase of generated heat, and a difficulty in downsizing.

Figure 9:
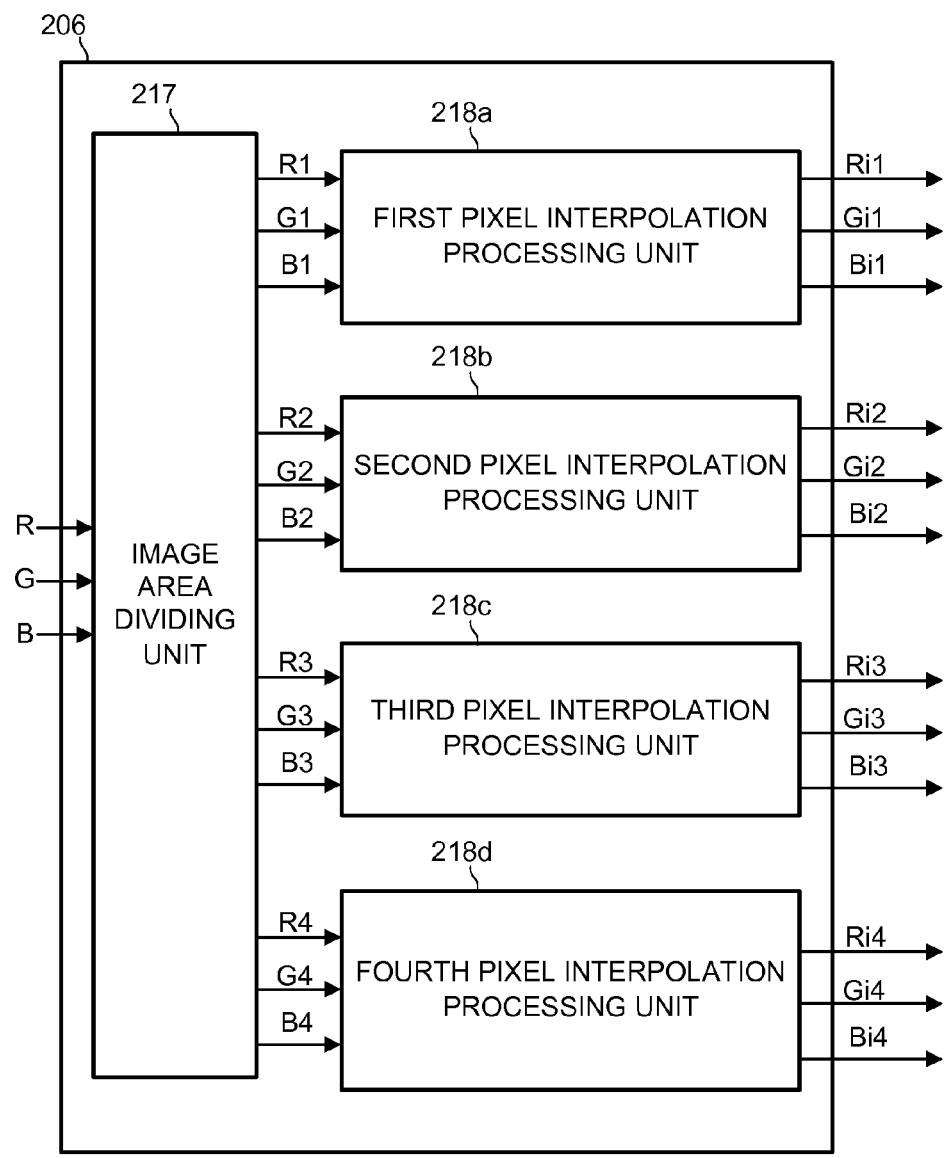
FIG. 9 is a block diagram of an image processing unit 206 according to a comparative example.
Figure 10:
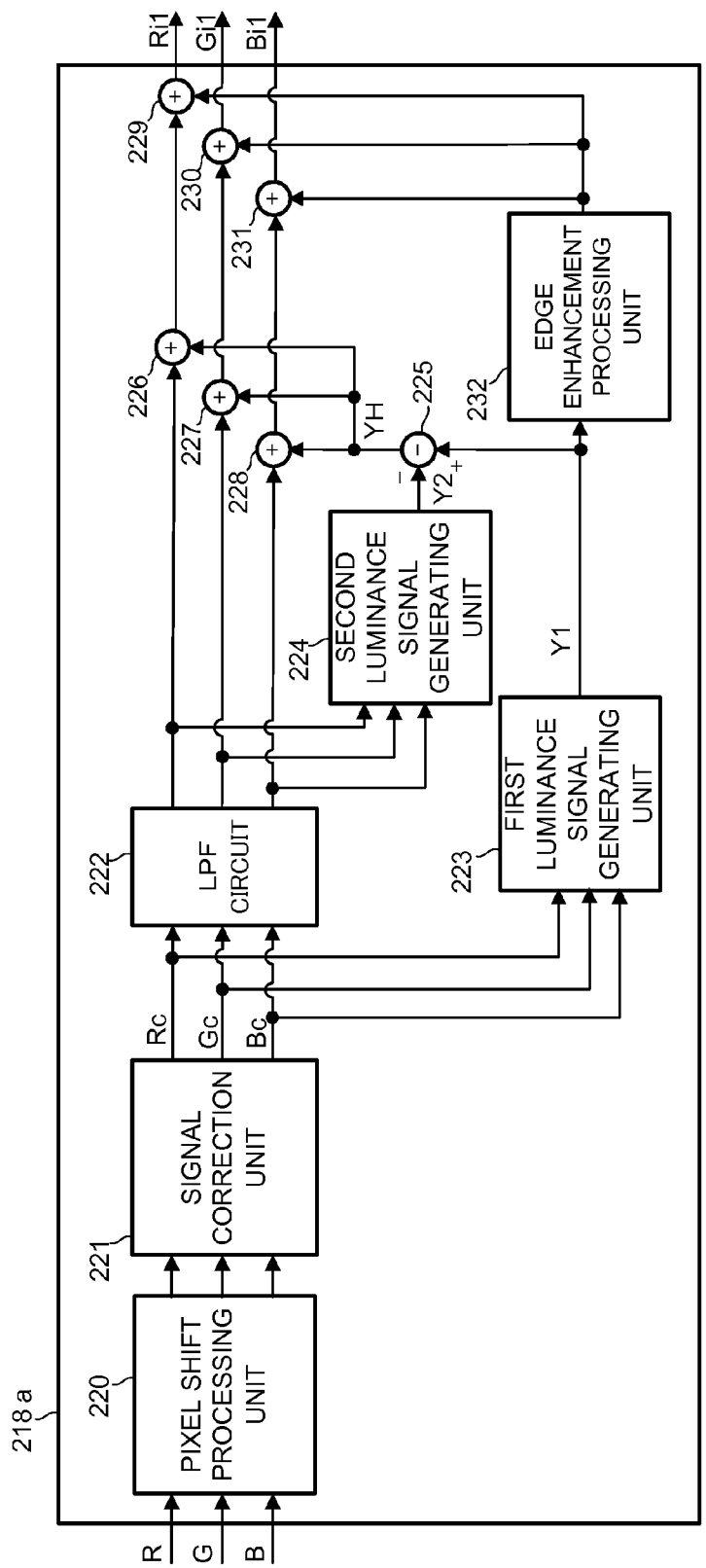
FIG. 10 is a block diagram of a pixel interpolation processing unit 218a according to the comparative example.

As illustrated in FIG. 9 and FIG. 10, an image processing unit 206 according to a comparative example in which a first to a fourth pixel interpolation processing unit 218a to 218d are mounted as the plural arithmetic circuits has been proposed. Hereinafter, the image processing unit 206 will be described in detail with reference to FIG. 9 and FIG. 10. FIG. 9 is a block diagram of the image processing unit 206 according to the comparative example. FIG. 10 is a block diagram of the pixel interpolation processing unit 218a.

As illustrated in FIG. 9, the image processing unit 206 has an image area dividing unit 217 and the first to fourth pixel interpolation processing units 218a to 218d. The image processing unit 206 is capable of increasing the number of pixels of an image by the pixel shift processings.

As illustrated in FIG. 10, the first pixel interpolation processing unit 218a has a pixel shift processing unit 220, a signal correction unit 221, a LPF circuit 222, a first and a second luminance signal generating unit 223 and 224, a subtracting unit 225, adding units 226 to 231, and an edge enhancement processing unit 232.

The first and second luminance signal generating units 223 and 224 each have a matrix circuit for generating a luminance signal from R, G, B image signals. The first pixel interpolation processing unit 218a sometimes further has an information adding unit for adding a signal for OSD (On-Screen Display), a signal for color bars, and a signal for blanking, on a subsequent stage of the adding units 229 to 231.

The second to fourth pixel interpolation processing units 218b to 218d each have the same structure as that of the first pixel interpolation processing unit 218a.

In the image processing unit 206 having the above-described structure, the image area dividing unit 217 first holds the R, G, B image signals for one frame which are output by image sensors 13r, 13g, and 13b. The image area dividing unit 217 outputs the R, G, B image signals corresponding to each predetermined area to each of the first to fourth pixel interpolation processing units 218a to 218d.

In the first pixel interpolation processing unit 218a, the pixel shift processing unit 220 in the first pixel interpolation processing unit 218a applies the pixel shift processings to the R, G, B image signals output from the image area dividing unit 217. Then, the signal correction unit 221 applies knee correction processing and γ correction processing to the R, G, B image signals having undergone the pixel shift processings. The R, G, B image signals having undergone the knee correction processing and the γ correction processing are converted to a luminance signal Y1 and a low-frequency luminance signal Y2 by the LPF circuit 222 and the first and second luminance signal generating units 223 and 224.

The subtracting unit 225 subtracts the low-frequency luminance signal Y2 from the luminance signal Y1. As a result, a high-frequency luminance signal YH is generated. The edge enhancement processing unit 232 applies edge enhancement processing to the luminance signal Y1. The adding units 226 to 231 add the high-frequency luminance signal YH and the luminance signal Y1 which has undergone the edge enhancement processing, to each of the R, G, B image signals having passed through the LPF circuit 222. The addition processing by the adding units 226 to 228 corresponds to the mixed highs processing of the imaging device 1 of this embodiment.

As a result, image signals Ri1 to Bi1 are generated. Similarly, the second to fourth pixel interpolation processing units 218b to 218d generate image signals Ri2 to Ri4, Gi2 to Gi4, and Bi2 to Bi4 illustrated in FIG. 9 respectively.

As described above, in the image processing unit 206 according to the comparative example, mounting the first to fourth pixel interpolation processing units 218a to 218d enables processing of a high-definition image.

However, in the image processing unit 206, since the first to fourth pixel interpolation processing units 218a to 218d each have the pixel shift processing unit 220, the signal correction unit 221, the LPF circuit 222, the first and second luminance signal generating units 223 and 224, the subtracting unit 225, the adding units 226 to 231, and the edge enhancement processing unit 232, a circuit scale is likely to increase.

(Regarding Effects of Imaging Device 1)

According to the imaging device 1 of this embodiment, it is possible to suppress an increase of the circuit scale owing to the following factors (1) to (6). Further, it becomes possible to process a high-definition image while suppressing an increase of power consumption, a temperature rise of generated heat, and realizing downsizing.

(Factor 1)

As illustrated in FIG. 3, in the imaging device 1, the signal correction processing unit 110, the edge enhancement circuits 112, 113, the adding circuits 114, 115, and the color difference signal generating unit 116 (image correction circuit 116d) are disposed on a previous stage of the image dividing circuit 117. Therefore, each of the first to fourth pixel interpolating units 118 to 121 are not need to have the signal correction processing unit 110, the edge enhancement circuits 112, 113, the adding circuits 114, 115, and the color difference signal generating unit 116 (image correction circuit 116d).

(Factor 2)

By the intermediate arithmetic circuit 111 generating the image signal Srb, the edge enhancement circuit 113 and the adding circuit 115 are capable of applying the edge enhancement processing collectively to the red image signal Rc and the blue image signal Bc. That is, there is no need to mount the edge enhancement circuit 113 and the adding circuit 115 dedicated to the red image signal Rc and the edge enhancement circuit 113 and the adding circuit 115 dedicated to the blue image signal Bc.

(Factor 3)

By the intermediate arithmetic circuit 111 calculating the image signal Srb, it is possible to reduce the number of the signal lines and at the same time generate the luminance signal Y whose low-frequency component is of higher quality as compared with the high-frequency luminance signal YH, and generate the high-frequency luminance signal YH whose high-frequency component is of higher quality as compared with the luminance signal Y, owing to the reduction of the aliasing noise. As a result, it is possible to generate the luminance signals Yi1 to Yi4 whose low to high-frequency components are of high quality while realizing the simplification of a wiring pattern. Here, "the simplification" means, for example, to reduce the number of branches of wiring lines and to reduce the number of the wiring lines.

(Factor 4)

By generating the luminance signal Yi1 based on the image signals Yg1, Yrb1 and the color difference signals Pb1, Pr1 input to the first pixel interpolating unit 118, it is possible to more simplify the wiring pattern in the first pixel interpolating unit 118 illustrated in FIG. 6 than in the first pixel interpolation processing unit 218a illustrated in FIG. 10. For example, the number of the adding units 226 to 231 illustrated in FIG. 10 can be reduced.

(Factor 5)

Since the first pixel shift processing circuit 116a illustrated in FIG. 4 first performs part of the pixel shift processing which is performed by the third pixel shift processing circuit 118g illustrated in FIG. 6, a load of the pixel shift processings to the processing unit 118g is lightened.

(Factor 6)

By the spatial pixel shifts and the pixel shift processings, it is possible to process an image whose resolution is equal to or higher than an actual resolution that the image sensors 13r, 13g, and 13b have.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the first pixel shift processing circuit 116a may generate only the green image signal Gc1 without generating the red image signal Rc1 and the blue image signal Bc1. Alternatively, the first pixel shift processing circuit 116a may generate the red image signal Rc1 and the blue image signal Bc1 without generating the green image signal Gc1.

For example, the image processor 106 may have converting units which convert the luminance signals Yi1 to Yi4, the color difference signals Pbi1 to Pbi4, and the color difference signals Pri1 to Pri4 into RGB signals. Further, the image processor 106 may have an information adding circuit for adding a signal for OSD, a signal for color bars, and a signal for blanking.

For example, the first pixel shift processing circuit 116a may be disposed on a subsequent stage of the color difference signal generating circuit 116c. The first pixel shift processing circuit 116a may have the same function as that of the third pixel shift processing circuit 118g. Conversely, the third pixel shift processing circuit 118g may have the same function as that of the first pixel shift processing circuit 116a. In this case, one of the circuits can be eliminated.

For example, the image dividing circuit 117 may divide an area of an image into four only in the vertical direction or may divide it into four only in the lateral direction. Alternatively, the area may be divided into totally two to three areas or may be divided into totally five areas or more.

For example, the intermediate arithmetic circuit 111 calculates the image signal Srb by multiplying the red image signal Rc and the blue image signal Bc by the factors respectively (refer to the mathematical formula 1), but may simply add Rc and Bc without using the factors. In this case, in the first to fourth pixel interpolating units 118 to 121, the red image signal Rc and the blue image signal Bc are multiplied by the predetermined factors respectively. Alternatively, the intermediate arithmetic circuit 111 may add all the red, green, and blue image signals Rc, Gc, and Bc.

What is claimed is:

1. An image processing device comprising:
    an input circuit to input a first to a third image signal respectively corresponding to different first to third colors of an image;
    a first generator to generate a fourth image signal by adding the first and second image signals;
    an enhancing circuit to apply edge enhancement processing to the third and fourth image signals;
    an output circuit to output the third and fourth image signals having undergone the edge enhancement processing in correspondence to a plurality of different areas of the image;
    a dividing circuit to divide the output third image signal and the output fourth image signal into a plurality of fifth image signals and a plurality of sixth image signals respectively; and
    a second generator to generate a luminance signal based on the plural fifth and sixth image signals.

2. The image processing device of claim 1, wherein the image includes a plurality of first pixels of the first color, a plurality of second pixels of the second color and a plurality of third pixels of the third color,
    the first pixels are disposed at first space coordinates,
    the second pixels are disposed at second space coordinates coinciding with the first space coordinates, and
    the third pixels are disposed at third space coordinates deviating from the first space coordinates.

3. The image processing device of claim 1, further comprising:
    a color difference signal generator to generate a color difference signal based on the first to third image signals;
    a second output circuit to output the generated color difference signal in correspondence to the areas of the image; and
    a second dividing circuit to divide the output color difference signal into a plurality of second color difference signals in correspondence to the fifth and sixth image signals.

4. The image processing device of claim 1,
    wherein the first generator generates the fourth image signal by multiplying the first and second image signals by a first and a second weighting factor k1 and k2 different from each other respectively and thereafter adding the resultant first and second image signals, and
    wherein the second generator comprises:
        a first luminance signal generator to generate a first luminance signal by multiplying the fifth and sixth image signals by a third and a fourth weighting factor k3 and k4 different from each other respectively and thereafter adding the resultant fifth and sixth image signals;
        a second luminance signal generator to generate a second luminance signal by multiplying the fifth and sixth image signals by a fifth and a sixth weighting factor k5 and k6 different from each other respectively and thereafter adding the resultant fifth and sixth image signals, the second luminance signal in which an aliasing noise is more reduced than in the first luminance signal; and
        an adding circuit to add the first and second luminance signals to generate the luminance signal.

5. The image processing device of claim 4, wherein the first to sixth weighting factors k1 to k6 are k1=0.75, k2=0.25, k3=0.72, k4=0.28, k5=0.5, and k6=0.5.

6. The image processing device of claim 1, further comprising a signal correction processor to apply at least one of γ processing and knee processing to the first to third image signals.

7. The image processing device of claim 3, further comprising a display unit to display an image corresponding to the luminance signal and the second color difference signals.

8. An image processing system comprising:
    an imaging unit configured to output a first to a third image signal respectively corresponding to different first to third colors of an image; and
    an image processing device configured to receive the first to third image signals output from the imaging unit,
    the image processing device including,
        an input circuit to input the first to third image signals;
        a first generator to generate a fourth image signal by adding the first and second image signals;
        an enhancing circuit to apply edge enhancement processing to the third and fourth image signals;
        an output circuit to output the third and fourth image signals having undergone the edge enhancement processing in correspondence to a plurality of different areas of the image;
        a dividing circuit to divide the output third image signal and the output fourth image signal into a plurality of fifth image signals and a plurality of sixth image signals respectively; and
        a second generator to generate a luminance signal based on the plural fifth and sixth image signals.

9. The image processing system of claim 8, wherein the image includes a plurality of first pixels of the first color, a plurality of second pixels of the second color and a plurality of third pixels of the third color,
    the first pixels are disposed at first space coordinates,
    the second pixels are disposed at second space coordinates coinciding with the first space coordinates, and
    the third pixels are disposed at third space coordinates deviating from the first space coordinates.

10. The image processing system of claim 8,
    wherein the image processing device further comprises:
        a color difference signal generator to generate a color difference signal based on the first to third image signals;
        a second output circuit to output the generated color difference signal in correspondence to the areas of the image; and
        a second dividing circuit to divide the output color difference signal into a plurality of second color difference signals in correspondence to the first and sixth image signals.

11. The image processing system of claim 8,
    wherein the first generator generates the fourth image signal by multiplying the first and second image signals by a first and a second weighting factor k1 and k2 different from each other respectively and thereafter adding the resultant first and second image signals, and wherein the second generator comprises:
- a first luminance signal generator to generate a first luminance signal by multiplying the fifth and sixth image signals by a third and a fourth weighting factor k3 and k4 different from each other respectively and thereafter adding the resultant fifth and sixth image signals;
- a second luminance signal generator to generate a second luminance signal by multiplying the fifth and sixth image signals by a fifth and a sixth weighting factor k5 and k6 different from each other respectively and thereafter adding the resultant fifth and sixth image signals, the second luminance signal in which an aliasing noise is more reduced than in the first luminance signal; and
- an adding circuit to add the first and second luminance signals to generate the luminance signal.

12. The image processing system of claim 11, wherein the first to sixth weighting factors k1 to k6 are k1=0.75, k2=0.25, k3=0.72, k4=0.28, k5=0.5, and k6=0.5.

13. The image processing system of claim 8, wherein the image processing device further comprises a signal correction processor to apply at least one of γ processing and knee processing to the first to third image signals.

14. An image processing method comprising:
- inputting, by an input circuit, a first to a third image signal respectively corresponding to different first to third colors of an image;
- generating, by a first generator, a fourth image signal by adding the first and second image signals;
- applying, by an enhancing circuit, edge enhancement processing to the third and fourth image signals;
- outputting, by an output circuit, the third and fourth image signals having undergone the edge enhancement processing in correspondence to a plurality of different areas of the image;
- dividing, by a dividing circuit, the output third image signal and the output fourth image signal into a plurality of fifth image signals and a plurality of sixth image signals respectively; and
- generating, by a second generator, a luminance signal based on the plural fifth and sixth image signals.

15. The image processing method of claim 14, wherein the image includes a plurality of first pixels of the first color, a plurality of second pixels of the second color and a plurality of third pixels of the third color,
- the first pixels are disposed at first space coordinates,
- the second pixels are disposed at second space coordinates coinciding with the first space coordinates, and
- the third pixels are disposed at third space coordinates deviating from the first space coordinates.

16. The image processing method of claim 14, further comprising:
- generating, by a color difference signal generator, a color difference signal based on the first to third image signals;
- outputting, by a second output circuit, the generated color difference signal in correspondence to the areas of the image; and
- dividing, by a second dividing circuit, the output color difference signal into a plurality of second color difference signals in correspondence to the fifth and sixth image signals.

17. The image processing method of claim 14, further comprising:
- multiplying, by the first generator, the first and second image signals by a first and a second weighting factor k1 and k2 different from each other respectively and thereafter adding the resultant first and second image signals to generate the fourth image signal;
- generating, by a first luminance signal generator, a first luminance signal by multiplying the fifth and sixth image signals by a third and a fourth weighting factor k3 and k4 different from each other respectively and thereafter adding the resultant fifth and sixth image signals;
- generating, by a second luminance signal generator, a second luminance signal by multiplying the fifth and sixth image signals by a fifth and a sixth weighting factor k5 and k6 different from each other respectively and thereafter adding the resultant fifth and sixth image signals, the second luminance signal in which an aliasing noise is more reduced than in the first luminance signal; and
- adding, by an adding circuit, the first and second luminance signals to generate the luminance signal.

18. The image processing method of claim 17, wherein the first to sixth weighting factors k1 to k6 are k1=0.75, k2=0.25, k3=0.72, k4=0.28, k5=0.5, and k6=0.5.

19. The image processing method of claim 14, further comprising applying, by a signal correction processor, at least one of γ processing and knee processing to the first to third image signals.

20. The image processing method of claim 16, further comprising displaying, by a display unit, an image corresponding to the luminance signal and the plural second color difference signals.

* * * * *